United States Patent [19]
Galvin et al.

[11] Patent Number: 4,544,836
[45] Date of Patent: Oct. 1, 1985

[54] OPTICALLY-BASED ACCESS CONTROL SYSTEM

[75] Inventors: Aaron A. Galvin, Lexington; Roy L. Harvey, Milton; Kenneth J. Leff, Halifax, all of Mass.

[73] Assignee: American District Telegraph Company, New York, N.Y.

[21] Appl. No.: 452,308

[22] Filed: Dec. 22, 1982

[51] Int. Cl.4 .............................................. G06K 19/00
[52] U.S. Cl. ................................... 235/487; 235/468; 235/488
[58] Field of Search ............... 235/449, 487, 468, 488; 283/90, 91

[56] References Cited

U.S. PATENT DOCUMENTS

| | | | |
|---|---|---|---|
| 2,330,718 | 9/1943 | Kallmann | 283/90 |
| 3,391,479 | 7/1968 | Buzzell | 283/90 |
| 3,626,160 | 12/1971 | Hagopian | 235/449 |
| 3,793,565 | 2/1974 | Smith | 235/487 X |
| 4,034,211 | 7/1977 | Horst | 235/493 X |
| 4,175,775 | 11/1979 | Kruegle | 283/91 |

Primary Examiner—Harold I. Pitts
Attorney, Agent, or Firm—Weingarten, Schurgin Gagnebin & Hayes

[57] ABSTRACT

An optically-based coded card identification system is provided in which a card having an access code defined by adjacent differently-polarized elements used in a transmissive or reflective mode is interrogated through a deep red or near infrared transmissive filter as the card is pased by a source of illumination. The use of polarization coupled with the adjacency of the differently-polarized elements makes the code nearly invisible to the naked eye, with the code being made more invisible due to the low visible light transmission of the filter on the face of the card. In one embodiment, coding for the cards is provided by overlying layers of material polarized in different directions, with portions of the layers provided with offset apertures so that light through an aperture in one layer is polaried by an unapertured portion of the adjacent layer immediately thereunder. Alternatively, the same coding effect may be achieved by providing two differently stretched overlying layers of specially prepared transparent material, overprinted front and back with offset iodine patterns, with the iodine causing a polarization characteristic to be imparted to the material at the overprinted area to provide the access code. In one embodiment, the coding elements are arranged in two rows defining complementary codes such that areas of complementary polarizations are simultaneously decoded to provide complementary signals for increasing security and the signal-to-noise ratio for the system. In a further embodiment, an unpolarized detector coupled to a pulsed output detector is used to detect the pulses produced by the light and dark areas of a bar code provided by ordinary printing of a bogus card and to inhibit access upon detection of such a bogus card.

15 Claims, 17 Drawing Figures

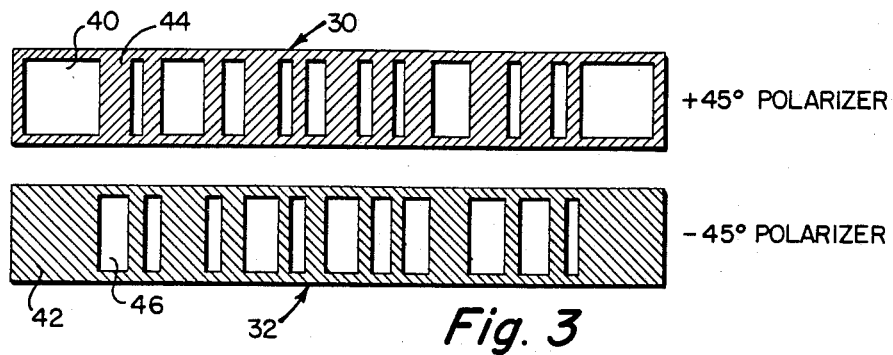
Fig. 3
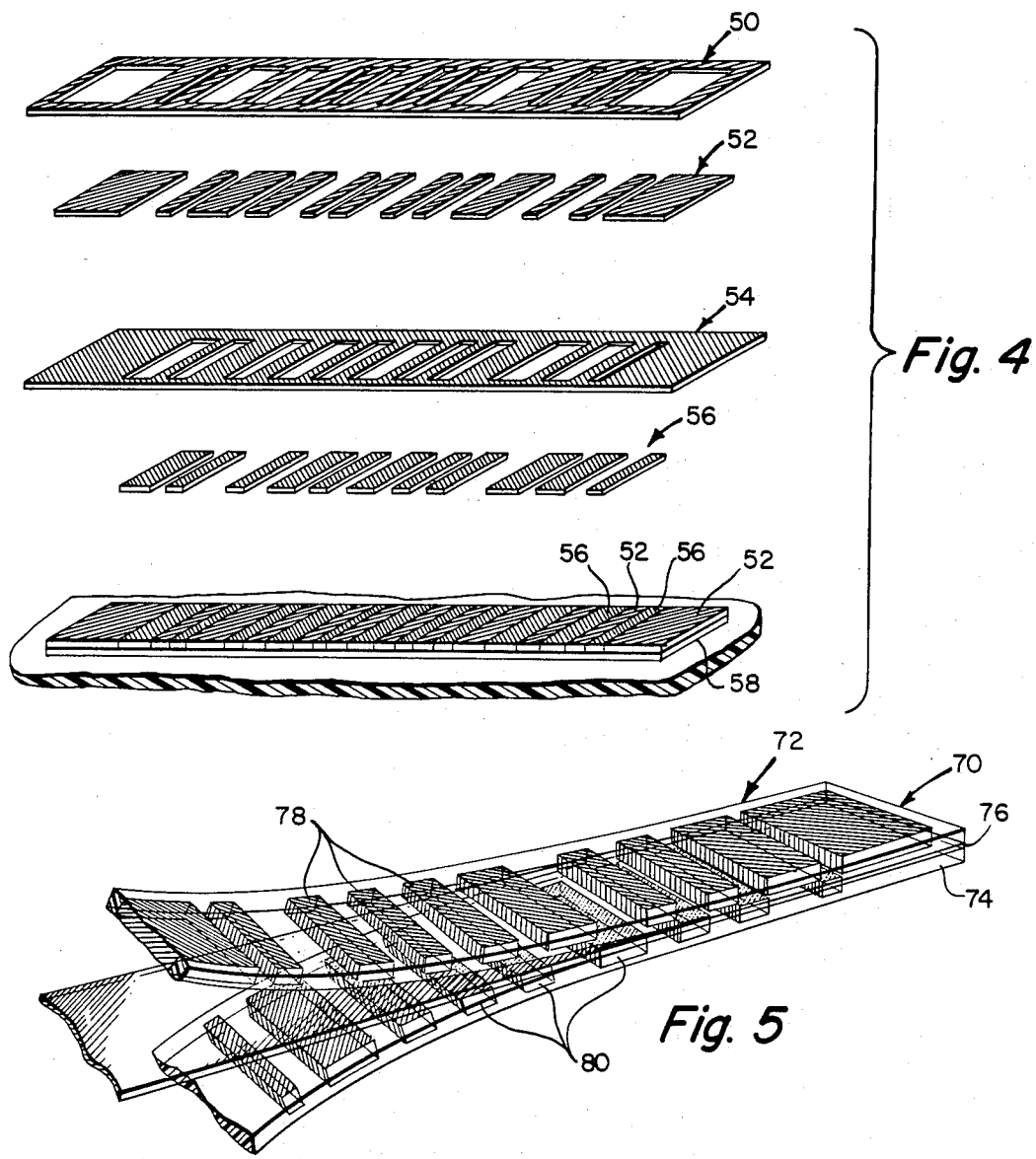
Fig. 4
Fig. 5

OPTICALLY-BASED ACCESS CONTROL SYSTEM

FIELD OF THE INVENTION

This invention relates to the field of card access and more particularly, to systems which utilize optical techniques for reading the access control information contained on or in the card.

BACKGROUND OF THE INVENTION

Recently, the field of coded cards for control of access to buildings, money machines, inventory control, time and attendance records, and guard tour clocking has shown an accelerated growth, largely because of the higher degree of security afforded by the use of cards as opposed to mechanical keys. Keys, as opposed to cards, are easily duplicated and cannot be cancelled if one or more are lost. Moreover, the often needed changes in tumbler patterns coupled with issuance of new keys are very expensive.

Along with the growth of card access techniques has come a proliferation of new card and reader technology. Although the most popular technologies involve the use of magnetics in some form, such as the use of embedded magnets, magnetic sheet material with magnetized areas, a series of embedded square loop magnetic wires, magnetic stripes, a matrix of embedded magnetic shields, etc., other technologies are coming into use such as the use of RF resonance, capacitance coupling, punched holes, and laser-coded spots.

These techniques have a number of limitations based on the relative ease with which an individual can decode the information on the cards and the ability to manufacture the cards with the necessary codes in a repeatable, easily performed, low cost manner. It will be appreciated that the provision of a multiplicity of codes is imperative to establish the singular identity of the particular card and that techniques involving the physical placement of elements within the card structure are prohibitively time consuming and expensive. On the other hand, the utilization of an easily generated magnetic coding is exceedingly easy to read out by virtue of passing the card through a magnetic readout head. Thus, the level of security for the card is diminished by the accessibility to readout of the individual code. Moreover, if magnetic shields are utilized for coding, the card can be X-rayed and duplicated assuming access to blank cards.

One technique involves the use of so-called Wiegand wire in which the cards are coded by the placement of wires. The code is not readily duplicatable because the wire itself is not readily available. One drawback to this technique is that the cards are relatively expensive due to the individual placement of the small wires within the card structure.

Optical coding systems are well known as indicated by the universal product code which is optically interrogated. It will be appreciated that the utilization of this type of code on a card is not only readily visible, but exceedingly easy to duplicate with current techniques. The universal product code does however provide an extremely large number of code possibilities and would therefore be extremely useful as a coding technique were it not for the ready accessibility to the code from the surface of card. Other optical encoding systems include the utilization of spots which are infrared transmissive yet opaque to light in the visible region of the electromagnetic spectrum. The coded areas pass infrared and reject all other light to provide the code. However, it is possible to visually ascertain the location of the infrared transmissive spot, and while these cards are difficult to duplicate, the codes are easily ascertainable.

It is therefore desirable to provide for the manufacture of cards with a simple process for encoding which is difficult to duplicate and which is difficult to read out for the unauthorized user. The card must have a code pattern which is quite well hidden to the naked eye and which involves a code which provides for an added level of security.

SUMMARY OF THE INVENTION

In the subject invention, a card usable in either a reflective or transmissive mode is provided with an optical coding structure comprising adjacent regions of different polarization, which regions form code elements that are illuminated sequentially by a beam of light as the card is passed by the beam. The reader includes one or more photodetectors which have polarizing filters arranged to detect the polarized light from the coding elements. In a preferred embodiment, a deep red or near infrared transmissive filter is placed over the coded area to prevent readout of the code by visual inspection. Moreover, because the differently-polarized adjacent regions appear a uniform grey or red to the naked eye, the code is all but invisible during visual inspection. As such, the card includes the combination of plastic polarizing sheet material, an optional reflecting surface, and a deep red or near infrared transmissive filter, with the card being decoded and read by a low cost reader which utilizes a red or near infrared illuminator and a detector, plus a combination of optics and a polarizing filter. The use of this technique permits the manufacture of a low cost card which is stable and very difficult for an unauthorized person to read or duplicate. Moreover, the card reader is exceptionally simple in operation and construction making it very low cost.

In one embodiment, the code is provided by overlying strips of polarizing material with the strips having different polarization directions. The code for the underlying strip is formed by punching out or removing material from the overlying strip such that light passes through the resulting aperture in the overlying strip and is polarized by the strip of material therebeneath to polarize the unpolarized light passing through the aperture. The adjacent code for the overlying strip is provided by punching or cutting out material from the underlying strip such that light polarized by the overlying strip passes through the aperture in the underlying strip with its polarization intact. A manufacturing technique for this arrangement consists of stacking two sheets of cross-polarized material and punching the layers in such a way that the material from the bottom layer is ejected as scrap and the material from the top layer is transferred into the bottom layer where it is retained by friction until laminated into a finished card.

This manner of providing alternating code markings or portions adjacent one another, prevents visual readout of the code because visual inspection of the strip sandwich reveals only the presence of a grey strip, the different polarizations of the composite strip structure not being visually ascertainable by the naked eye.

In an alternative version, a sandwich of two adjacent strips of transparent orthogonally polarizable material is overprinted front and back with a series of offset lines which polarize the material to provide the alternating polarized code elements. Thus, if one side is provided with a line, the other side immediately under the line is left unprinted and vice-versa. This results in an offsetting of the front and back lines such that the composite structure acts in the same manner as the punched-out version to give adjacent coding elements different polarizations. The printing involves the depositing of iodine onto the polarizable material. The polarizable material has previously been stretched in a predetermined direction such that the places at which iodine is deposited are polarized in a direction dictated by the stretching direction. The non-overprinted areas remain transparent and unpolarized. Using two strips of differently stretched material to sandwich a transparent barrier layer provides a composite strip which, when appropriately overprinted, functions in the same manner as the punched-out version mentioned above. In one embodiment, when overlying strips of polarizable material are provided with offset coding marks, unpolarized light passing through the sandwiched structure acquires either a +45° polarization or a −45° polarization referenced to the direction of card travel, depending on which surface the iodine mark is made.

In an alternative embodiment, a complementary code is provided in which the code is patterned in two rows, one above the other such than an area with one polarization is immediately above one with another polarization. Two detectors are utilized to simultaneously sense each row of codes such that vertically aligned code areas are simultaneously decoded. Note, one code pattern is the complement to the other code pattern. The complementary nature of this type of detection permits an added degree of security against unauthorized or bogus cards because if a card with only one polarized code is used, or if the card has a simple unpolarized black/white code, the two detector outputs are identical and threshold circuits are provided to reject the data. Moreover, the utilization of the two-detector system with complementary coding can be set up with different polarization angles. This permits a greater number of system code numbers than if differentiation depends solely on a binary code alone. For example, the angles could be 90° and 0° rather than ±45°. Although the greatest signal-to-noise ratio is obtained if the polarization angles are orthogonal, systems could be made with three or more angles to obtain a higher data density.

Not only does the complementary system result in greater security, but a greater signal-to-noise ratio can be realized due to the complementary nature of the outputs of the two photodetectors utilized.

In a still further embodiment, bogus cards which are merely overprinted with an ordinary bar code can be rejected with a system utilizing two photodetectors. One photodetector has a polarizing filter interposed between it and the card, while the other photodetector has no such filter. The output of the photodetector having the filter is decoded conventionally. The other photodetector is connected to a circuit which detects pulses which would be generated by transmitted or reflected light from light and dark areas of a bar code as the card is moved through the reader. Upon detection of a pulsed output, the decoder is inhibited so that bogus cards are rejected.

The subject card may be used in combination with a reader in which access is permitted either by entry of the appropriately keyed-in code number, the readout of the card-carried access code, or both. In the latter case, the card offers an additional degree of security because of the two codes involved.

BRIEF DESCRIPTION OF THE DRAWINGS

These and other features of the subject invention will be better understood in connection with the detailed description taken in conjunction with the drawings of which:

FIG. 3 is a diagrammatic illustration of the coding strips of FIG. 2, illustrating the offset nature of the coding pattern on the two strips;

FIG. 4 is a diagrammatic illustration of one method of achieving side-by-side polarizing elements of alternating polarization for use in the system of FIG. 1;

FIG. 5 is a partial cross-sectional and diagrammatic illustration of a further alternative method of providing the side-by-side polarizing elements for use in the system of FIG. 1 in which two strips of polarizable material sandwich a barrier layer, with the strips, when polarized, providing polarization in different directions;

DETAILED DESCRIPTION

Figure 1:
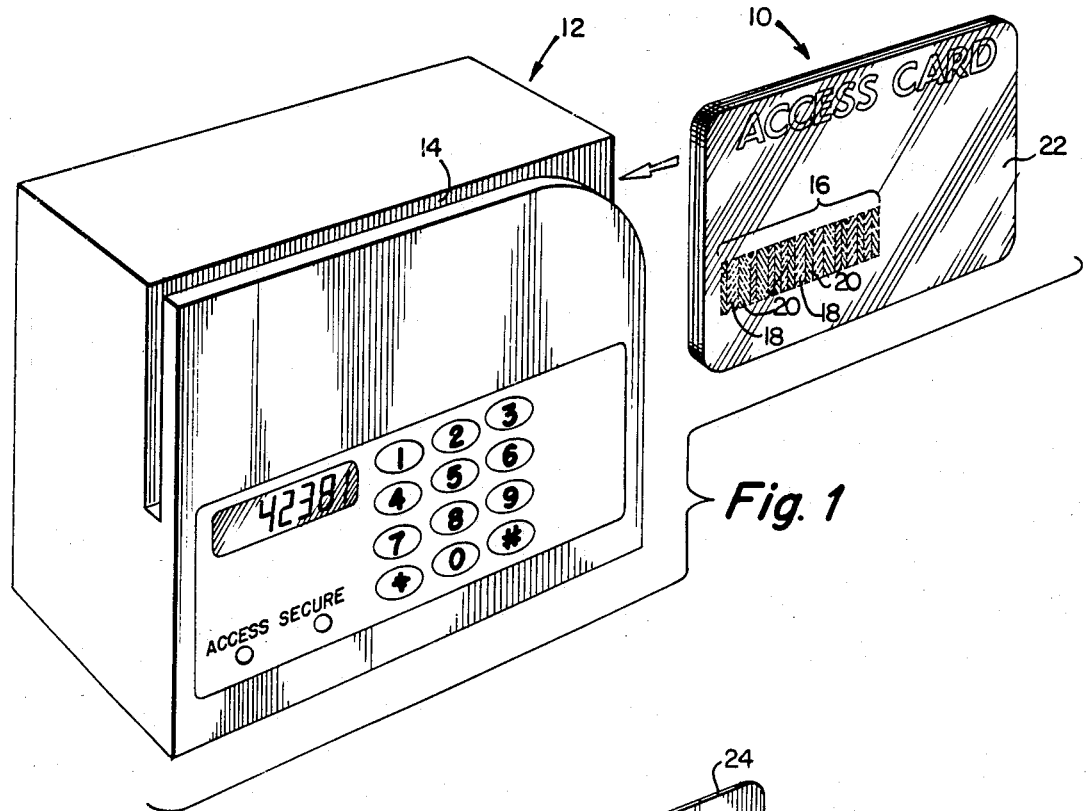
FIG. 1 is a diagrammatic illustration of the utilization of the subject access card with a card reader in which the access card is provided with an invisible code of differently polarized coding elements.

Referring now to FIG. 1, an optically-based access control system is provided which includes an access card 10 which is presented to a reader 12 by the passage of the card through a slot 14 in the reader housing. The card is provided with an invisible access code diagrammatically illustrated at 16 comprised of coding elements 18 and 20 which are differently polarized. It will be noted that elements 18 and 20 are adjacent and because of the polarization coding adjacency, visual readout of the code is almost impossible. This is because the access code appears as a uniform gray strip to the naked eye, since the polarized coding cannot be detected without the utilization of polarization filters. This yields a high degree of security against unauthorized reading and subsequent duplication.

Additionally, a deep red or infrared transmissive cover sheet 22 is placed over the code to further increase security since the code can now only be read out through the utilization of an infrared light source and infrared detection apparatus having appropriate polarization filters.

Figure 2:
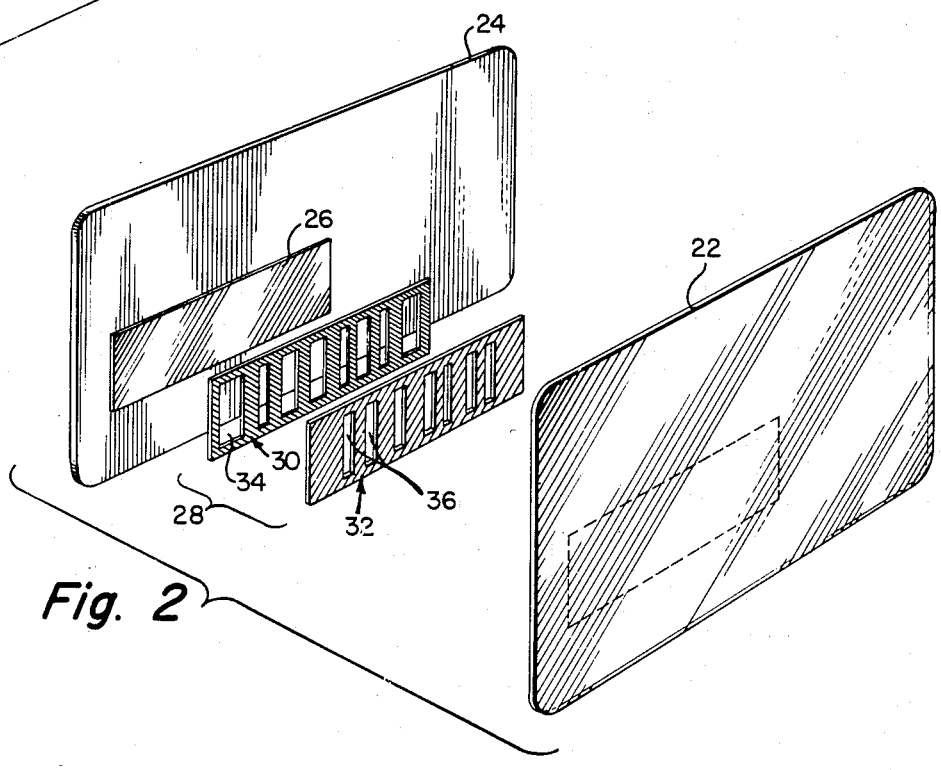
FIG. 2 is an exploded view of the construction of the card in FIG. 1, illustrating the combination of a coding strip or strips sandwiched between a reflector and a deep red or infrared transmissive cover sheet which acts as a transmissive filter.

Referring to FIG. 2, in one embodiment card 10 includes a backing sheet or member 24 on which is provided a reflector 26 located in back of the coding area 28 which, in the embodiment of FIG. 2, is comprised of strips 30 and 32 of oppositely polarized material. The use of the reflector constitutes the reflective mode in which the card can be read from one side. Alternatively, reflector 26 is eliminated and member 24 is made either transparent or translucent. This corresponds to a transmissive mode in which the card is illuminated from one side and decoded from the other.

Strips 30 and 32 are provided with sets of apertures 34 and 36 respectively, with the apertures being arranged in offset fashion such that light through an aperture in one strip is polarized by an unapertured portion of the adjacent strip immediately thereunder.

The offset nature of this type of coding system can be seen in FIG. 3 in which an aperture 40 in strip 30 immediately overlies an unapertured portion 42 of strip 32. Likewise, an unapertured portion 44 of strip 30 overlies an apertured portion 46 of strip 32. The shape of corresponding apertured and unapertured portions is identical such that the sandwiching of the strips together as illustrated in FIG. 2, presents adjacent alternately polarized elements.

An alternative method of fabricating differently polarized coding elements adjacent each other is illustrated in FIG. 4 in which a strip 50 is punched-out to provide coding elements 52 of one type of polarization. A strip 54 is punched-out as illustrated to provide coding elements 56 of a different polarization. These punched-out elements are then affixed to a reflector or the card backing material 58 by any suitable process to provide the alternating adjacent differently polarized coding elements.

While the above methods of fabricating coding elements may be implemented in any suitable fashion, a simple printing method may be utilized to provide for coding elements of different polarizations which are adjacent each other.

Referring now to FIG. 5, a sandwich structure 70 is provided with a top strip 72 of material stretched in one direction and a bottom strip of material 74 stretched in a different direction. A transparent layer 76 of material is sandwiched between these two strips to provide improved structural characteristics and to prevent diffusion of polarizing chemicals on one strip to the other strip. The strips are given a predetermined polarized pattern by printing with special dyes a patterned series of marks, here indicated generally at 78 for strip 72 and 80 for strip 74. As before, the patterning on the top and bottom strips is offset to provide alternating polarization elements as described hereinbefore.

The patterning is accomplished, in one embodiment, by a simple overprinting process in which iodine is deposited on a plastic film, usually of polyvinyl alcohol. The film, in one embodiment, is about four mils thick which, prior to being overprinted, passes through a stretch oven. In the stretch oven, it stretches to about 3.5 times its original length and shrinks in width and thickness. The stretching aligns the polyvinyl alcohol molecules in a predetermined direction. After stretching, the polyvinyl alcohol film is solvent-bonded to a suitable substrate, typically cellulose acetate butyrate. The minimum practical thicknesses for the polyvinyl alcohol film and the corresponding substrate are about one and four mils respectively. The next step is the process for overprinting is an iodine dying step. The polyvinyl alcohol forms a helix that traps the iodine and potassium iodide molecules. It will be noted that the pattern of the overprint may be accomplished with any of several commercially available processes including gravure and ink jet. Next, the dye is fixed with boric acid which also cross links the polyvinyl alcohol. The polarizer formed thus far may be protected by bonding another protective cellulose acetate butyrate layer on top of the overprinted layer. It will be noted that since polyvinyl alcohol may be scratched fairly easily, a reactive diacrylate can be applied to the sandwich on both sides to resist abrasion. The diacrylate is applied as a monomer, and is then polymerized by pressing the treated surface against a smooth drum.

Barrier layer 76 protects one layer from the other in terms of the polarization which takes place due to the overprinting of the iodine such that offset patterns may be printed onto opposing sides of the composite structure.

Figure 6A:
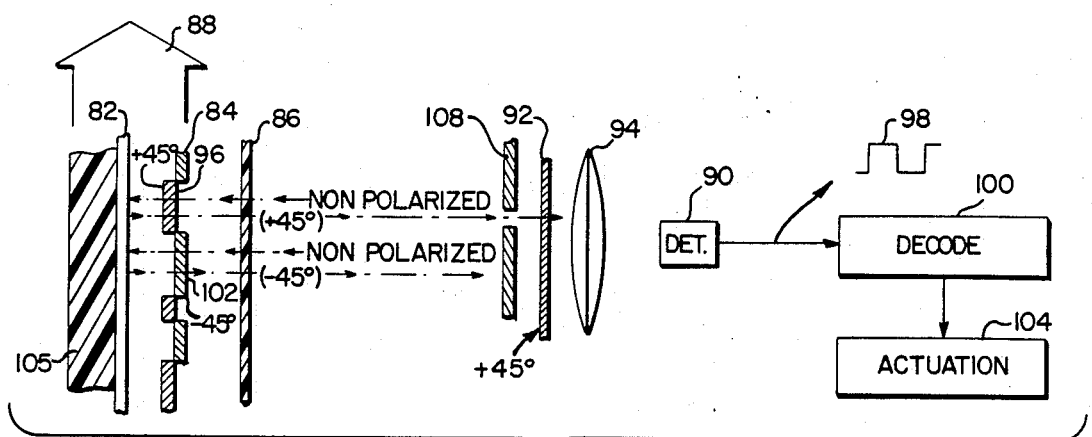
FIG. 6A is a diagrammatic and schematic illustration of a reflective system for the decoding of a card provided with alternating polarizing elements.

Referring now to FIG. 6A illustrating the reflective embodiment, a card manufactured in the above manner with a reflective layer 82, a code strip 84, and a deep red or near infrared transmissive filter 86 is moved in the direction illustrated by arrow 88 past the head of a card reader which includes a detector 90. A polarizer 92 is placed between the card and the detector. Note, focusing optics 94 may be employed.

In operation, as the card is moved in the direction 88 and is illuminated in one embodiment with non-polarized radiation, the non-polarized radiation passes through filter 86 and through a polarizing element 96 where it obtains, in one instance, a+45° polarization. The light then is reflected by reflector 82 back through this element which preserves the same +45° polarization. Polarizer 92, being a+45° polarizing element, passes this light to detector 90 which provides a pulsed output 98 to a conventional decoding unit 100.

As the card moves further past detector 90, the non-polarized light passes through a polarizing element 102 which is polarized in this embodiment in a −45° direction so as to impart a −45° polarization to the light passing therethrough. This light is also reflected by reflector 82 and passes back through element 102 where it is rejected by polarizer 92. The signals from detector 90 corresponds to only the coding provided by the +45° polarized elements, the purpose of the −45° adjacent coding elements being to prevent visual access to the code. As illustrated, when a proper card has been presented to the code reader, the decode unit 100 provides a signal for actuation of an appropriate device as indicated at 104. Note that a slit mask 108 is provided to prevent more than one code element from being read at a time while the card moves by the detector.

Figure 6B:
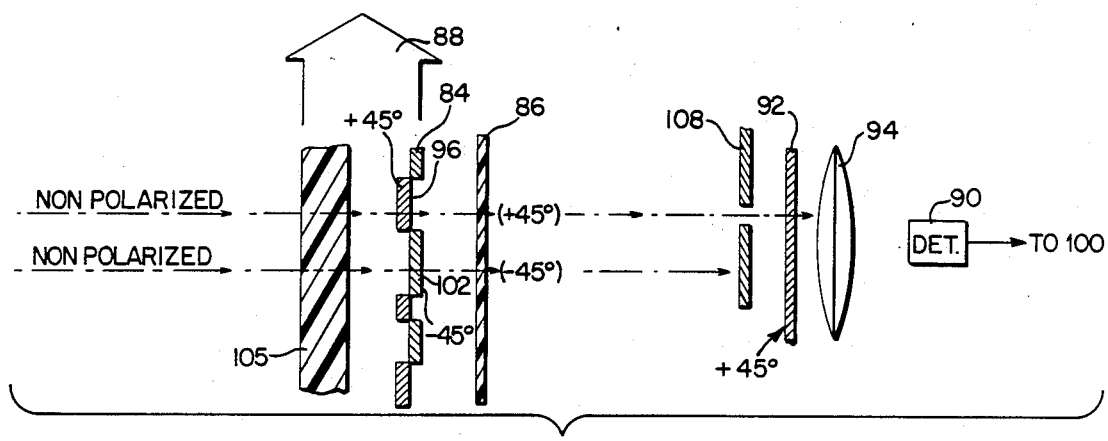
FIG. 6B is a diagrammatic and schematic illustration of a transmissive system for the decoding of a card provided with alternating polarizing elements.

Referring now to FIG. 6B, the transmissive embodiment is illustrated in which like elements between FIGS. 6A and 6B carry like reference characters. From inspection, it will be appreciated that reflective layer 82 is removed and that non-polarized light is transmitted to the polarizers through a translucent or transparent card backing material 105. It has been found that material generally used for cards transmits enough diffuse light through the polarizers to permit detection of the code in the manner described in connection with FIG. 6A. Card backing materials include acrylonitrile butadiene styrene, polyimide, polyester, polyvinyl chloride, or polycarbonate.

Figure 7:
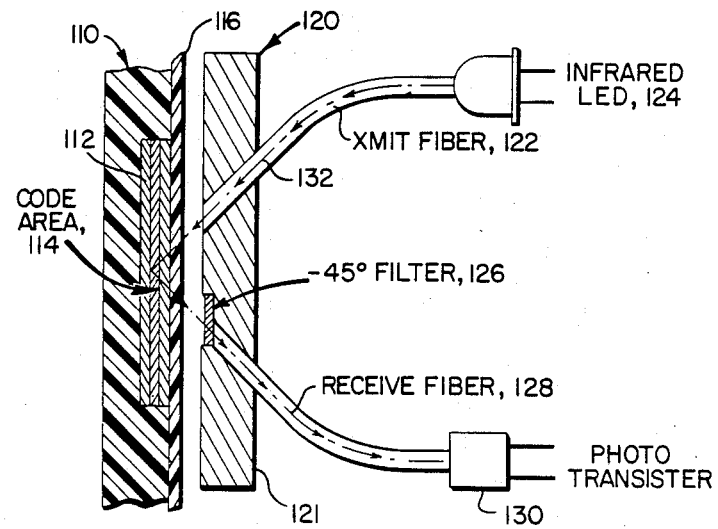
FIG. 7 is a cross-sectional and diagrammatic illustration of a portion of the optical reader for the system of FIG. 1, illustrating the readout of a card which is moved past the readout head of the card reader.

Referring now to FIG. 7, a side and cross-sectional view of a card reader structure is illustrated in which a card 110 having a reflector 112, a code area 114, and an infrared transmissive filter 116 is passed in close proximity by a head 120. The head includes a support block 121 which is apertured to receive an optical fiber 122 illuminated at one end with light from an infrared light emitting diode 124. Light from the other end of the fiber illuminates code area 114 as illustrated. Light from the code area passes through a polarizing filter 126 carried by support block 121 and is located just ahead of an optical fiber 128 carried in an aperture in support block 121. This fiber channels light to a phototransistor 130 as illustrated. The angle of incidence of the light from transmit fiber 122 equals the angle of reflection to receiver fiber 128 such that a light beam 132, when reflected and properly passed by the filter 126, reaches phototransistor 130.

Figure 8:
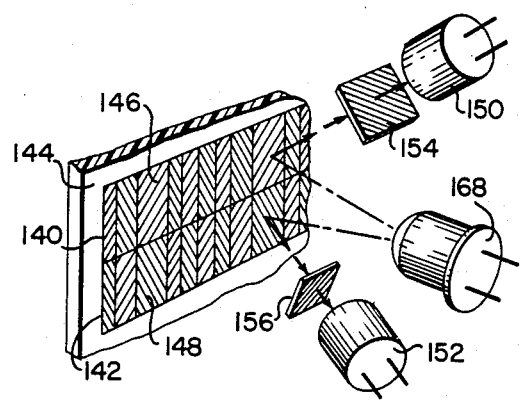
FIG. 8 illustrates diagrammatically a two-row complementary coding system in which vertically adjacent portions of the code simultaneously are read by two photodetectors.
Figure 9:
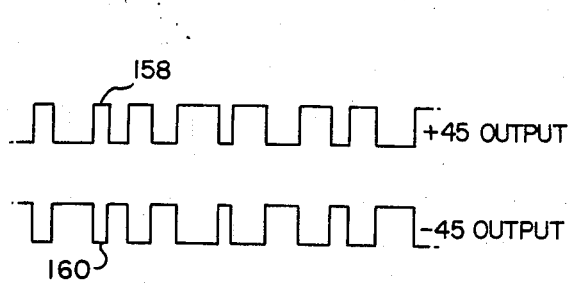
FIG. 9 is a wave form diagram of the outputs of the photodetectors of FIG. 8, illustrating the complementary wave forms.

As mentioned hereinbefore, complementary codes may be provided in two rows for added security for the system. Referring now to FIG. 8, two rows 140 and 142 are provided on a reflector 144 with the complementary nature of the codes being illustrated by the different shading of elements 146 and 148. In this embodiment, two photodetectors 150 and 152 are provided off-axis with corresponding polarizers 154 and 156, each polarizer having different polarizations. The outputs from the photodetectors are complementary as can be seen from FIG. 9 and wave forms 158 and 160.

Figure 10:
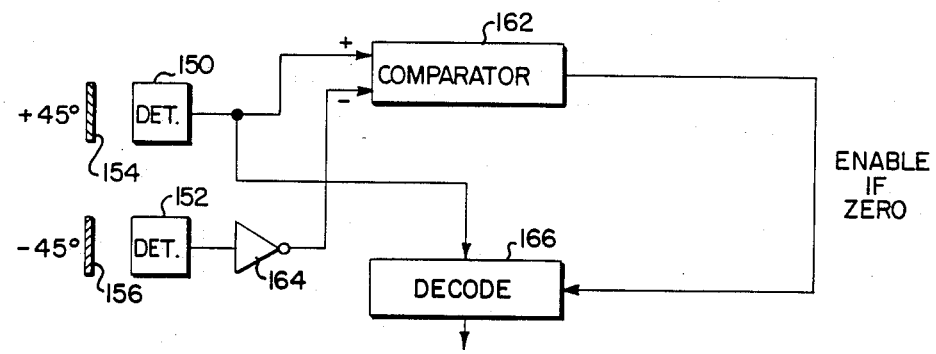
FIG. 10 is a schematic diagram of a system which may be utilized to decode the information from the detectors of FIG. 8 for inhibiting decoding of an output of a decoder when a bogus card not having a two-row complementary code is presented to a card reader.

As illustrated in FIG. 10 in schematic form, polarizer 154 is designated +45° and polarizer 156 is designated −45°. The output of detector 150 is coupled to one input of a comparator 162, with the output from detector 152 being inverted at 164 and being provided to the other input of comparator 162. The output of detector 150 is applied to a conventional decode unit 166, the operation of which is inhibited by an output from the comparator when the output of the comparator is zero or sufficiently close to zero. It will be appreciated that with complementary codes, the outputs of detectors 150 and 152 will be identical assuming a single light source 168 as illustrated in FIG. 8 and utilizing matched elements. Thus, the comparator may be a simple subtracting circuit which subtracts the inverted output from detector 152 from the output of detector 150. When the result of this subtraction is substantially zero, decode unit 166 is enabled.

Figure 11:
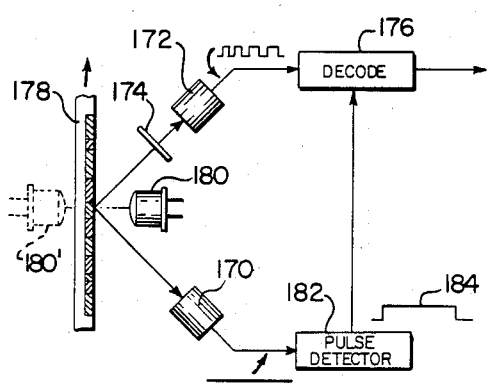
FIG. 11 is a schematic and diagrammatic illustration of a system in which bogus cards overprinted with an ordinary bar code may be detected through the utilization of an unpolarized photodetector in which a card carrying an appropriate polarization code is moved past a readout head.
Figure 12:
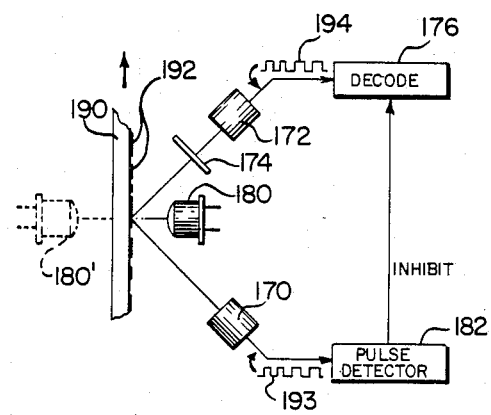
FIG. 12 illustrates the passage of an ordinary bar coded card past the readout head of FIG. 11, illustrating the inhibiting of the decoder of FIG. 11 upon a pulsed output from the unpolarized photodetector.

Referring now to FIGS. 11 and 12, protection from the use of bogus cards which are merely overprinted with an unpolarized bar code may be achieved by utilizing a photodetector 170 which is not provided with any type of polarizing filter. Detector 172 is provided with a polarizing filter 174, the output of which is decoded by decoder 176. As described hereinbefore when a card diagrammatically illustrated at 178 having alternating differently polarized elements is passed through the card reader after having been illuminated by a light source 180, the output of photodetector 170 applied to a pulse detector 182 is flat as illustrated at 183 and results in the production of a steady state output 184 since no pulses are applied thereto. This will be the case when an appropriate card is passed through the card reader. The reason that the output of detector 170 will be uniform is that there will be no distinction between differently polarized elements within the card. The output from pulse detector 182 is utilized to enable decoder 176 to permit the decoding of the output from detector 172 in the manner described above.

Note in FIGS. 11 and 12, the system illustrated is equally applicable to the transmissive embodiment in which a light source 180' is located on the side of the card opposite the detectors. It is a finding of this invention that light penetrating the transmissive card backing material is both diffuse enough and sufficient to be read from the side of the card opposite the light source.

Referring to FIG. 12, a bogus card 190 having a simple overprinted bar code 192 when passed through the card reader will result in a pulsed output 193 of detector 172 being applied to pulse detector 182. A similar pulsed output from detector 172, here illustrated at 194, is applied to decoder 176. Ordinarily, this output would be decoded by decoder 176 in the normal manner and the bogus card could be utilized to gain unauthorized access. However, the output of photodetector 170 is pulsed and will be detected by pulse detector 182 to be such. In this instance, an inhibit signal is provided by pulse detector 182 to inhibit decoder 176 to prevent unauthorized access. Pulse detector 182 may be configured as follows.

Figure 13:
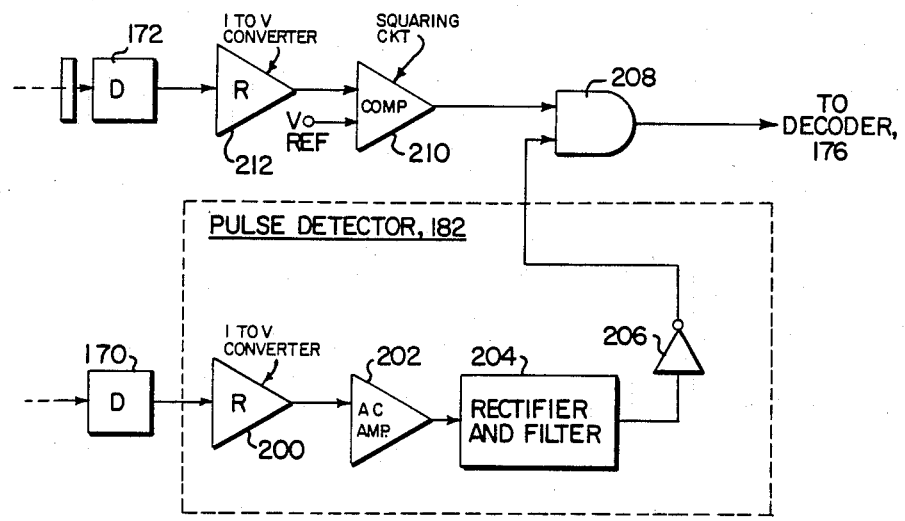
FIG. 13 is a schematic diagram of a bar code detector and one implementation of the pulse detector of FIG. 12.

Referring now to FIG. 13, pulse detector 182 may be implemented simply by a current-to-voltage converter 200, the output of which is coupled to an AC amplifier 202 which is in turn coupled to a rectifier and active filter circuit 204. The output of the rectifier and active filter circuit 204 is inverted by an inverter 206 and is applied to one input terminal of a two input terminal AND gate 208. The other input terminal to AND gate 208 is the output of a comparator 210 which serves as a squaring circuit for a signal from detector 172 which is converted from current to voltage via converter 212, the output of which is applied to one input terminal of comparator 210. The other input terminal of comparator 210 is connected to a reference voltage.

In operation, squared pulse signals from a non-bogus card will be gated by gate 208 to decoder 176. At the same time, the output from detector 170 will be a DC output which will not be amplified, rectified, filtered, or inverted such that an enable signal remains at the other input terminal of AND gate 208. Should a bogus card be present, the output from detector 170 will be pulsed and the pulsed signal will be amplified by amplifier 202. The amplified pulses will be rectified and filtered to produce an output which, when inverted at 206, removes the enable signal from AND gate 208, thereby precluding decoding of the signal from detector 172.

Figure 14:
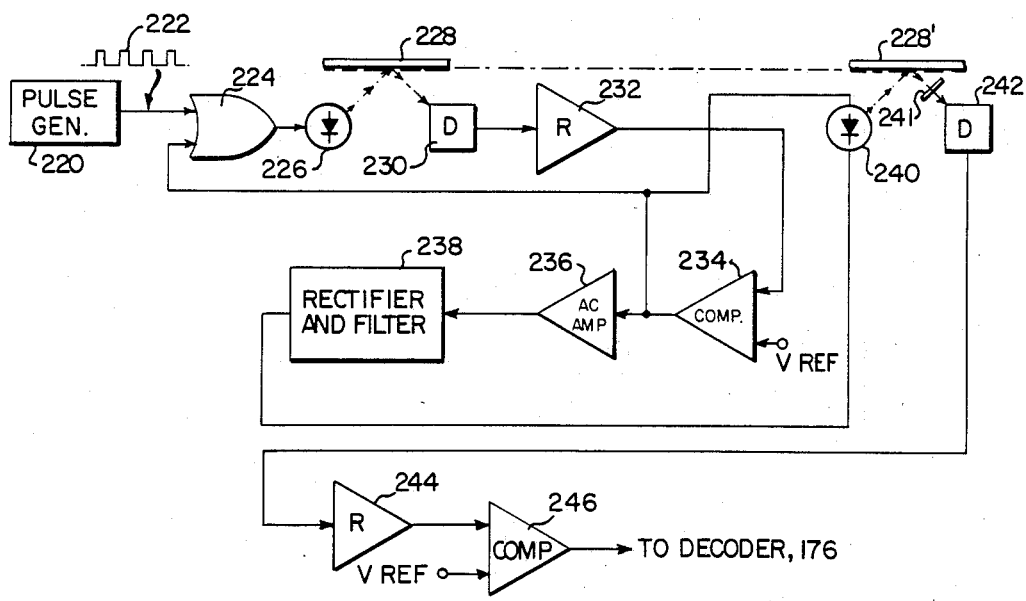
FIG. 14 is a schematic diagram of another type of pulse detector which includes a provision for sensing the presence of a card.

In an alternative embodiment, the presence of a card can be detected while at the same time detecting bogus cards through the utilization, as illustrated in FIG. 14, of a pulse generator 220 which applies its pulsed output 222 to an OR gate 224, the output of which is applied to a light emitting diode (LED) 226. Assuming the presence of a non-bogus card 228, the pulsed output will be reflected by the reflector within the card to detector 230, the output of which is converted from a current to voltage by converter 232. The output of this converter is applied to one input terminal of a comparator 234 having its other input terminal coupled to a reference voltage. The output of comparator 234 is applied to an AC amplifier 236, the output of which is applied to a rectifier and active filter 238, with the output of rectifier and filter 238 being applied to a second light emitting diode (LED) 240. The other input of LED 240 is coupled to the other input terminal of OR gate 224 with the same other terminal of the OR gate being coupled directly to the output of comparator 234.

Light from LED 240 is reflected by the reflector in card 228 when the card is in the position denoted by 228' to detector 242, the output of which is converted from a current to voltage by converter 244. The output of this converter is then applied to a comparator 246 which serves as a squaring circuit, the output of comparator 246 being applied to decoder 176 as above.

In operation, when no card is in the reader, there will be no optical coupling between LED 226 and detector 230. As such, the output of comparator 234 will be low and LED 240 will be off. This prevents decoding of any kind from occurring by virtue of an output from detector 242.

It will be appreciated that LED 226 will only be on for short intervals to detect whether or not a card has entered the reader. When a card is detected, the output of comparator 234 goes high and LED 226 locks on. LED 240 also turns on if there is no AC signal generated by detector 230 which has been amplified and rectified. If there is an AC signal, rectifier and filter 238 inhibits LED 240. With LED 240 turned on, card 228 is decoded by virtue of the output of detector 242.

It should be noted that if there is an AC signal from detector 230, LED 240 will never turn on and no signal will therefore be applied to decoder 176. As can be seen, AC signals of an optical nature will be applied to detector 230 only initially when a card is inserted into the reader. If the card is non-bogus, LED 226 will be latched on, whereas if the card is bogus, there will be an AC output from detector 230 which prevents LED 240 from being activated.

By way of further background, there are at least three types of codes which can be utilized in the subject card, namely a bar code, a complementary code, and a "clock" code, each of which has different software, hardware, and mechanical considerations, as well as differing code efficiencies.

In a bar code, the information is encoded in the relative widths of consecutive bars. In one implementation, a bar which is one unit long is a logical "zero". A bar which is two units long is a logical "one". Other length ratios may be used. The clock signal for data entry is obtained at the black-white edge transitions of the alternatively black and white bars.

In a complementary code, there are two tracks in which the information is encoded. The clock signal for data entry is obtained by an exclusive OR gate coupled to the outputs of the two detectors utilized. The data is obtained simply from one of the detectors.

In a clock code the information is encoded on one track while the clock signal comprising alternating black and white bars is found on a second track. The black-white edge transitions of the clock occur midway between the changes in data to insure that data will not change during clocking. It can be demonstrated that the clock code has the best code efficiency and/or the largest bar width. It will be appreciated that larger bars yield greater immunity to dirt and scratches.

All of the above codes may use an additional single detector-emitter pair without a polarizer in order to test whether or not the card is polarized. An AC output from the detector implies that the card is not made of polarized material. The bar code requires an additional detector on the same track to read the code. Both the complementary and clock codes require an additional detector-emitter-detector triplet in order to read the code. The triplet configuration can best be seen from FIGS. 11 and 12 whereas the doublet configuration can best be seen from FIG. 7.

With respect to software considerations, it will be appreciated that the software for reading a bar code is considerably different and more difficult than for the other two codes. The complementary and clock codes can, with minimal hardware, yield signals which are compatible. To read a bar code, one must measure the "length" of a bar by sampling it at a significantly higher frequency than that of the pulse itself. One must include in the software means to compensate for card acceleration. Reading a clock code, by comparison, is quite simple. The data can be clocked regardless of card speed. No sampling of data is needed nor are calculations necessarily to be made by the decoder. To read the complementary code, there is no need for special software. It is however necessary to remember the data output before the clock transition. This can be accomplished using an RC time delay, or the information may be stored. While bar code detectors are illustrated in FIGS. 13 and 14, a clock code detector is illustrated in FIG. 15 and a complementary code detector is illustrated in FIG. 16.

Figure 15:
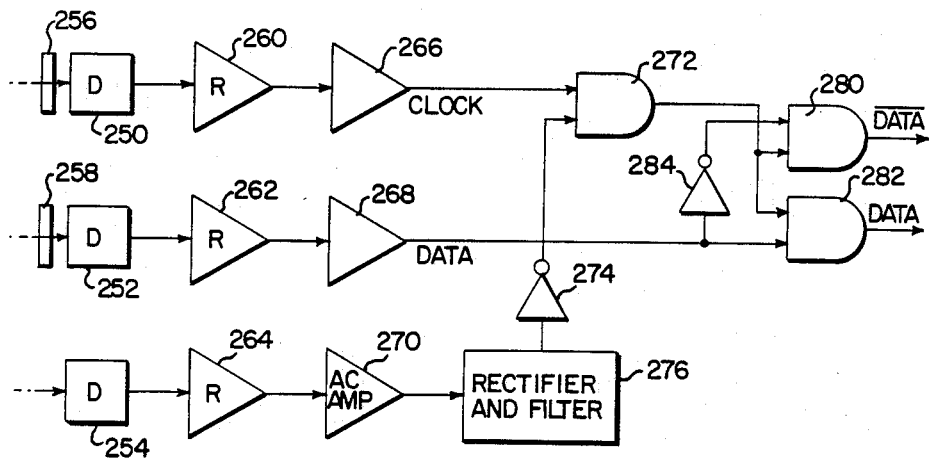
FIG. 15 is a schematic diagram of a clock code reader.

Referring now to FIG. 15, a circuit is described for decoding a clock code which includes three photodetectors 250, 252, and 254, with detectors 250 and 252 having polarizers 256 and 258 interposed between themselves and light reflected from a card. Detectors 250, 252, and 254 have their outputs coupled respectively to current-to-voltage converters 260, 262, and 264. Converters 260 and 262 are coupled to Schmitt triggers 266 and 268 respectively, whereas the output of converter 264 is coupled to an AC amplifier 270. The output of Schmitt trigger 266 is coupled to one input terminal of a two input terminal AND gate 272 which has its other input terminal coupled to an inverter 274, which is in turn coupled to a rectifier and active filter 276. It will be appreciated that the rectifier and active filter has its input coupled to the output of AC amplifier 270. The output of AND gate 272 is coupled to one input terminal of a two input terminal AND gate 280 and to one input terminal of a two input terminal AND gate 282. The output of Schmitt trigger 268 is coupled to the other input terminal of AND gate 282 and through an inverter 284 to the other input terminal of AND gate 280. Data from Schmitt trigger 266 constitutes the clock signal whereas the output of Schmitt trigger 268 constitutes a data signal. It will be appreciated that the output of AND gate 282 is a data signal whereas the output of AND gate 280 is the complement of this signal. An output from rectifier and active filter 276 which is inverted inhibits clock pulses from AND gate 272 from being applied to AND gates 280 and 282, thereby to inhibit the system for a bogus card. Because the clock pulse is provided intermediate the data elements, data is clocked through at the appropriate time. Schmitt triggers are used for noise immunity.

Figure 16:
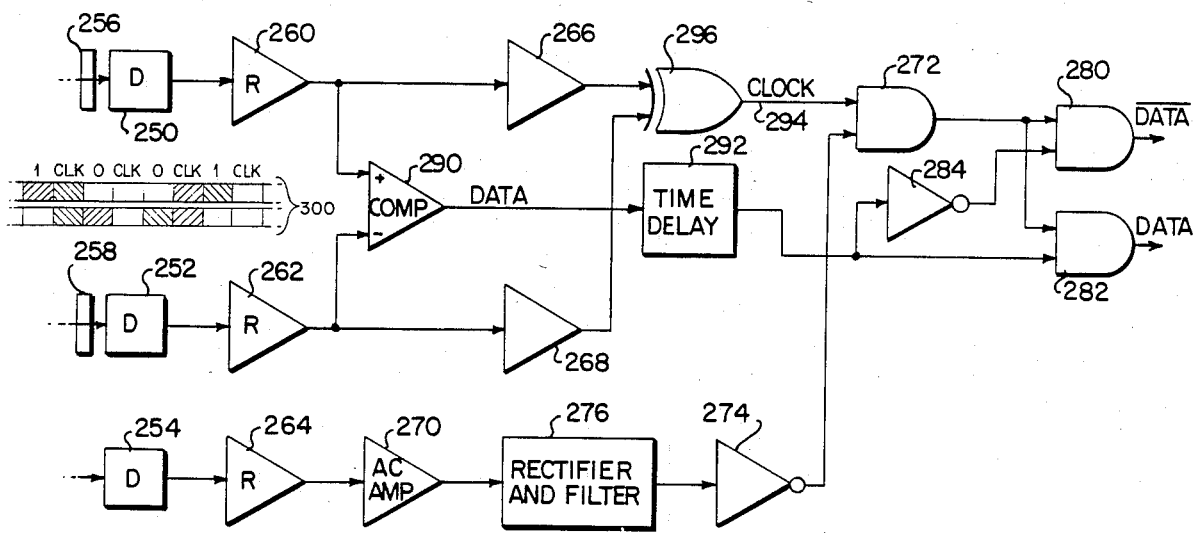
FIG. 16 is a schematic diagram of a complementary code reader.

Referring to FIG. 16, a circuit for decoding the complementary code is illustrated in which like elements with respect to FIG. 16 are so labelled. The difference in this circuit is that the outputs of converters 260 and 262 are applied not only to respective Schmitt triggers, but also to a comparator 290, the output of which is the data signal which is applied to a time delay 292, the output of which is applied to the respective input terminals of AND gates 280 and 282, respectively through inverter 284 and directly. The time delay is in general set less than one second, but greater than one hundred microseconds such that the data is delayed a predetermined amount vis a vis a clock signal on line 294 from an exclusive NOR gate 296 having one of its two input terminals coupled to Schmitt trigger 266 and the other of its two input terminals coupled to the output of Schmitt trigger 268. Thus, the data is applied to AND gates 280 and 282. A predetermined time after the clock pulse on line 294, the data is applied to AND gate 272. Also, the data signal with the complementary code is the differential between the data from detector 250 and the data from detector 252. One type of complementary coding system is illustrated at 300 in which 1, 0 data bits are interspersed with clock bits both polarized in one direction or the other. Note that comparator 290 may be a conventional comparator or may be a so-called "window" comparator of conventional design.

In operation, the AND gates 272 of FIGS. 15 and 16 prevent clock pulses from being presented to AND gates 280 and 282 thereby inhibiting operation for bogus cards.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. An optically-based coded card identification system comprising:
    a card having adjacent differently polarized elements defining a code; and
    a reading head for automatically decoding said card upon passage of said card past said head, said head having a channel through which said card is passed including means for illuminating said elements, means polarized in a predetermined direction for detecting polarized light from said elements and for producing an output signal responsive to light from a polarized element polarized in said predetermined direction arriving at said detecting means, and means for decoding the code represented by the output signal from said polarized detecting means.

2. The system of claim 1 and further including means at said head for detecting non-polarized light, means coupled to said non-polarized light detecting means for inhibiting said decoding means responsive to the presence of pulses at the output of said non-polarized light detecting means, thereby to detect the presence of dark and light overprinted bogus cards.

3. The system of claim 1 wherein said illuminating means and said detecting means operate in the invisible or nearly invisible portion of the electromagnetic spectrum and further including a optically opaque or nearly opaque transmissive filter over at least said adjacent polarized elements.

4. An optically-based coded card for use in a card identification system comprising:
    a card;
    a plurality of adjacent differently polarized optical coding elements attached thereto; and
    separate means for obscuring said optical coding elements from visual inspection.

5. The card of claim 4 wherein said card has a backing member and wherein said coding elements are affixed to said backing member.

6. The card of claim 4 wherein said means for obscuring comprises a transmissive filter covering said coding elements, said filter having a predetermined transmission characteristic corresponding to a predetermined portion of the electromagnetic spectrum.

7. The card of claim 6 wherein said transmissive filter permits transmission of the deep red or near infrared portions of the electromagnetic spectrum.

8. The card of claim 5 and further including reflector means interposed between said backing member and said coding elements.

9. The card of claim 4 wherein said coding elements include at least two sheets of polarizable material and a transparent sheet sandwiched therebetween, each of said polarizable sheets being overprinted with offset coding marks effective to give the overprinted areas a predetermined polarization characteristic.

10. The card of claim 4 wherein said coding elements include at least two overlying layers of differently polarized material with apertures placed therein, said apertures being positioned such that light through an aperture in one layer is polarized by an unapertured portion of the adjacent layer.

11. The card of claim 4 wherein said coding elements include a backing member and punched-out portions of differently polarized sheets, the punched-out portions being affixed to said backing member in adjacent positions.

12. The card of claim 4 wherein said coding elements are arranged in a line.

13. The card of claim 4 wherein said coding elements are arranged in lines one above the other and are configured to provide a complementary code.

14. The card of claim 4 wherein said card includes translucent material, said coding elements being affixed to said translucent material, whereby said coding elements may be interrogated by directing light through said card.

15. The card of claim 4 wherein said card includes transparent material, said coding elements being affixed to said transparent material, whereby said coding elements may be interrogated by directing light through said card.

* * * * *